(12) United States Patent
Lehtovirta et al.

(10) Patent No.: US 10,064,053 B2
(45) Date of Patent: Aug. 28, 2018

(54) AUTHENTICATION IN DEVICE TO DEVICE DISCOVERY

(71) Applicant: TELEFONAKTIEBOLGET L M ERICSSON (PUBL), Stockholm (SE)

(72) Inventors: Vesa Lehtovirta, Espoo (FI); Karl Norrman, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 14/437,662

(22) PCT Filed: Mar. 5, 2015

(86) PCT No.: PCT/SE2015/050250
§ 371 (c)(1),
(2) Date: Apr. 22, 2015

(87) PCT Pub. No.: WO2015/142247
PCT Pub. Date: Sep. 24, 2015

(65) Prior Publication Data
US 2016/0302062 A1    Oct. 13, 2016

Related U.S. Application Data

(60) Provisional application No. 61/968,725, filed on Mar. 21, 2014.

(51) Int. Cl.
*H04W 4/06* (2009.01)
*H04W 12/06* (2009.01)
(Continued)

(52) U.S. Cl.
CPC ............. *H04W 12/06* (2013.01); *H04W 4/06* (2013.01); *H04W 4/80* (2018.02); *H04W 8/005* (2013.01); *H04W 12/04* (2013.01); *H04W 76/10* (2018.02)

(58) Field of Classification Search
CPC ......... H04W 12/06; H04W 4/06; H04W 4/08; H04W 48/16; H04L 9/0816; H04L 9/0872; H04L 63/0492
See application file for complete search history.

(56) References Cited

U.S. PATENT DOCUMENTS

8,594,632 B1    11/2013 Azizi et al.
2010/0278120 A1    11/2010 Haddad et al.
(Continued)

FOREIGN PATENT DOCUMENTS

WO    2013/163634 A1    10/2013
WO    2014/037277 A1    3/2014
WO    2015/065165 A1    5/2015

OTHER PUBLICATIONS

Meier et al., Proximity-Based Service Discovery in Mobile Ad Hoc Networks, 2005.*
(Continued)

*Primary Examiner* — Hadi S Armouche
*Assistant Examiner* — Huan V Doan
(74) *Attorney, Agent, or Firm* — Rothwell, Figg, Ernst & Manbeck, p.c.

(57) ABSTRACT

There is provided a method for authentication in device to device discovery. A method performed by a Discoverer device, comprises broadcasting a direct discovery request, receiving a direct discovery response from a Discoveree device, the direct discovery response comprising a first token, and obtaining a determination of whether the first token was generated for the Discoveree device or not.

5 Claims, 10 Drawing Sheets

(51) Int. Cl.
*H04W 76/10* (2018.01)
*H04W 4/80* (2018.01)
*H04W 8/00* (2009.01)
*H04W 12/04* (2009.01)

(56) References Cited

U.S. PATENT DOCUMENTS

| | | | |
|---|---|---|---|
| 2011/0098043 | A1 | 4/2011 | Yu et al. |
| 2013/0155948 | A1* | 6/2013 | Pinheiro ............... H04W 4/005 370/328 |
| 2013/0290696 | A1* | 10/2013 | Broustis ................ H04L 9/08 713/150 |
| 2014/0130137 | A1* | 5/2014 | Baek ................... H04W 12/08 726/4 |
| 2014/0162601 | A1* | 6/2014 | Kim ..................... H04W 12/06 455/411 |
| 2014/0206348 | A1* | 7/2014 | Johnsson ............. H04W 8/005 455/434 |
| 2014/0370879 | A1* | 12/2014 | Redding .............. H04W 4/001 455/419 |
| 2015/0264663 | A1* | 9/2015 | Chen ................. H04W 76/023 455/450 |
| 2015/0358804 | A1* | 12/2015 | Fransen ................ H04L 12/18 370/329 |
| 2016/0065362 | A1* | 3/2016 | Choyi .................. H04L 63/065 380/279 |
| 2016/0165411 | A1* | 6/2016 | Lee ....................... H04W 4/08 455/426.1 |
| 2017/0013497 | A1* | 1/2017 | Lee .................... H04W 76/023 |

OTHER PUBLICATIONS

Yang et al., E-SmallTalker: A Distributed Mobile System for Social Networking in Physical Proximity, 10 pages.*
Simsek et al, Device-to-Device Discovery Based on 3GPP System Level Simulations, IEEE, 6 pages (Year: 2013).*
Extended European Search Report dated Jan. 3, 2017, issued for European patent application No. 15765552.3, 7 pages.
International Search Report and Written Opinion issued in corresponding international application No. PCT/SE2015/050250, dated Aug. 31, 2015, 15 pages.
"3rd Generation Partnership Project; Technical Specification Group Services and System Aspects; Service requirements for the Evolved Packet System (EPS) (Release 12)", 3rd Generation Partnership Project, 3GPP TS 22.278, v12.4.0, Sep. 2013, 45 pages.
"3rd Generation Partnership Project;Technical Specification Group Services and System Aspects;Proximity based Services; Stage 2 (Release 12)", 3rd Generation Partnership Project, 3GPP TS 23.303, v0.2.1, Feb. 2014, 55 pages.
"3rd Generation Partnership Project; Technical Specification Group Services and System Aspects;Study on architecture enhancements to support Proximity-based Services (ProSe) (Release 12)", 3rd Generation Partnership Project, 3GPP TR 23.703, V1.1.0, Jan. 2014, 348 pages.
"3rd Generation Partnership Project;Technical Specification Group Services and System Aspects Study on security issues to support Proximity Services (Release 12)", 3rd Generation Partnership Project, 3GPP TR 33.833, V0.4.0, Feb. 2014, 73 pages.
"3rd Generation Partnership Project;Technical Specification Group Services and System Aspects;Generic Authentication Architecture (GAA); Generic Bootstrapping Architecture (GBA) (Release 12)", 3rd Generation Partnership Project, 3GPP TS 33.220, V12.1.0, Jun. 2013, 92 pages.
Corrected International Preliminary Report on Patentability (Chapter II) issued in related International application No. PCT/SE2015/050250, dated Sep. 14, 2016, 25 pages.
ZTE, "Solution for ProSe discovery and communication", 3GPP, SA WG2 Meeting #96, San Diego, USA, S2-130979 (Apr. 8-12, 2013). (9 pages).
European Office Action dated Jul. 6, 2017 issued in European Patent Application No. 15 765 552.3. (7 pages).

* cited by examiner

AUTHENTICATION IN DEVICE TO DEVICE DISCOVERY

CROSS REFERENCE TO RELATED APPLICATION(S)

This application is a 35 U.S.C. § 371 National Phase Entry Application from PCT/SE2015/050250, filed Mar. 5, 2015, which claims priority to U.S. provisional application No. 61/968,725, filed on Mar. 21, 2014. The above identified applications are incorporated by reference.

TECHNICAL FIELD

Embodiments presented herein relate to authentication, and particularly to methods, wireless devices, a network node, computer programs, and a computer program product for authentication in device to device discovery.

BACKGROUND

In communications networks, there is always a challenge to obtain good performance and capacity for a given communications protocol, its parameters and the physical environment in which the communications network is deployed.

Proximity services (hereinafter ProSe) have recently been made available in communications networks. In general terms, proximity services are services that can be provided by some 3rd Generation Partnership Project (3GPP) communications networks based on wireless devices (hereinafter WDs) being in proximity to each other. One of these services is ProSe Discovery. The ProSe service is described in 3GPP TS 22.278 'Technical Specification Group Services and System Aspects; Service requirements for the Evolved Packet System (EPS) (Release 12)'—V12.4.0, Section: 7A.0A.1 and 3GPP TS 23.303 'Technical Specification Group Services and System Aspects; Proximity based Services; Stage 2 (Release 12)'—V0.2.1, Sections: 4.2, 5.3.2, 5.3.3.

ProSe Discovery identifies that ProSe-enabled WDs are in proximity of each other, using Evolved Universal Terrestrial Radio Access (E-UTRA), with or without the Evolved Universal Terrestrial Radio Access Network (E-UTRAN), or the Evolved Packet Core (EPC) network when permission, authorisation and proximity criteria are fulfilled. The proximity criteria can be configured by the operator.

In general terms, the ProSe Function comprises three main sub-functions that perform different roles depending on the ProSe feature. The Direct Discovery Name Management Function is one of the sub-functions.

The Direct Discovery Name Management Function is used for open Prose Direct Discovery to allocate and process the mapping of ProSe Applications identities or identifiers and ProSe Application Codes used in ProSe Direct Discovery. It uses ProSe related subscriber data stored in the Home Subscriber Server (HSS) for authorisation for each discovery request. It also provides the WD with the necessary security material in order to protect discovery messages transmitted over the air.

In order to perform device to device ProSe a Discoverer WD transmits information (such as a direct discovery request message) about other WDs that it would like to receive responses from. This approach may be regarded as querying "who is there/are you there". For example the transmitted information may be about a ProSe Application Identifier corresponding to a group and the members of the same group who listen and are interested in the same application (the ProSe Application Identifier) may respond to the Discoverer WD who then for example can start communication with the Group member(s), and so on.

When a Discoveree WD listens to Direct Discovery Request messages (e.g., on broadcast channels) and discovers a code or an identifier that the Discoveree WD is interested in, then the Discoveree WD replies by announcing a Direct Discovery Response message.

However, when the Discoverer WD receives the Direct Discovery Response message, it is today not possible for the Discoverer WD to be able to determine whether the responding WD is a genuine WD, i.e., a WD authorized to respond to the Direct Discovery request message or not. It could happen that a false Discoveree WD could fool the Discoverer WD that the false Discoveree WD is a genuine Discoveree WD which is currently located in proximity of the Discoverer WD. Also replay attacks where, for example, a false Discoveree WD is replaying genuine Direct Discovery response messages may occur. Such issues are not described in 3GPP TR 33.833 'Technical Specification Group Services and System Aspects Study on security issues to support Proximity Services (Release 12)'—V0.4.0, section 6.2.5.

Hence, there is a need for secure device to device discovery.

SUMMARY

An object of embodiments herein is to provide secure device to device discovery.

According to a first aspect there is presented a method for authentication in device to device discovery. The method is performed by a Discoverer device. The method comprises broadcasting a direct discovery request. The method comprises receiving a direct discovery response from a Discoveree device, the direct discovery response comprising a first token. The method comprises obtaining a determination of whether the first token was generated for the Discoveree device or not.

Advantageously this provides secure device to device discovery.

Advantageously, this enables the Discoverer WD to know that the Discoveree WD is genuine and that the Direct Discovery Response message is not replayed by a false WD.

According to embodiments the determination comprises querying a network node to determine whether the first token was generated for the Discoveree device or not.

Advantageously, this enables the Discoverer WD to know that the Discoveree WD is authorized by the ProSe Function in the network to respond to the announced Direct Discovery Request message.

If two identities are broadcasted in Direct Discovery Response message, for example a ProSe Application Identifier together with a ProSe WD Identifier of the Discoveree WD, then the ProSe WD Identifier of the Discoveree WD could be encrypted but the ProSe Application Identifier could be sent in clear text. This could be achieved if the Direct Discovery Response message is supporting partial encryption.

If two identities are broadcasted in the Direct Discovery Request message, for example a ProSe Application Identifier together with a ProSe WD Identifier of Discoverer WD, then the ProSe WD Identifier of the Discoverer WD could be encrypted but the ProSe Application Identifier could be sent in clear text. This could be achieved if the Direct Discovery Request message is supporting partial encryption.

According to a second aspect there is presented a wireless device for authentication in device to device discovery. The wireless device comprises a processing unit and a non-transitory computer readable storage medium, the non-transitory computer readable storage medium comprising instructions executable by the processing unit. The wireless device is operative to perform a method according to the first aspect.

According to a third aspect there is presented a computer program for authentication in device to device discovery, the computer program comprising computer program code which, when run on a wireless device, causes the wireless device to perform a method according to the first aspect.

According to a fourth aspect there is presented a method for authentication in device to device discovery. The method is performed by a Discoveree device. The method comprises receiving a broadcasted direct discovery request from a Discoverer device. The method comprises transmitting a direct discovery response to the Discoverer device, the direct discovery response comprising a first token.

According to a fifth aspect there is presented a wireless device for authentication in device to device discovery. The wireless device comprises a processing unit and a non-transitory computer readable storage medium, the non-transitory computer readable storage medium comprising instructions executable by the processing unit. The wireless device is operative to perform a method according to the fourth aspect.

According to a sixth aspect there is presented a computer program for authentication in device to device discovery, the computer program comprising computer program code which, when run on a wireless device, causes the wireless device to perform a method according to the fourth aspect.

According to a seventh aspect there is presented a method for authentication in device to device discovery. The method is performed by a network node. The method comprises receiving a request to generate a first token from a Discoveree device. The method comprises generating the first token. The method comprises transmitting the first token to the Discoveree device. The method comprises receiving a request from a Discoverer device to determine whether the first token was generated for the Discoveree device or not. The method comprises performing a determination of whether the first token was generated for the Discoveree device or not. The method comprises transmitting a result thereof to the Discoverer device.

According to an eight aspect there is presented a network node for authentication in device to device discovery. The network node comprises a processing unit and a non-transitory computer readable storage medium, the non-transitory computer readable storage medium comprising instructions executable by the processing unit. The network node is operative to perform a method according to the seventh aspect.

According to a ninth aspect there is presented a computer program for authentication in device to device discovery, the computer program comprising computer program code which, when run on a network node, causes the network node to perform a method according to the seventh aspect.

According to a tenth aspect there is presented a computer program product comprising a computer program according to at least one of the third aspect, the sixth aspect, and the ninth aspect and a computer readable means on which the at least one computer program is stored. The computer readable means may be non-transitory computer readable means.

It is to be noted that any feature of the first, second, third, fourth, fifth, sixth, seventh, eight, ninth, and tenth aspects may be applied to any other aspect, wherever appropriate. Likewise, any advantage of the first aspect may equally apply to the second, third, fourth, fifth, sixth, seventh, eight, ninth, and/or tenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
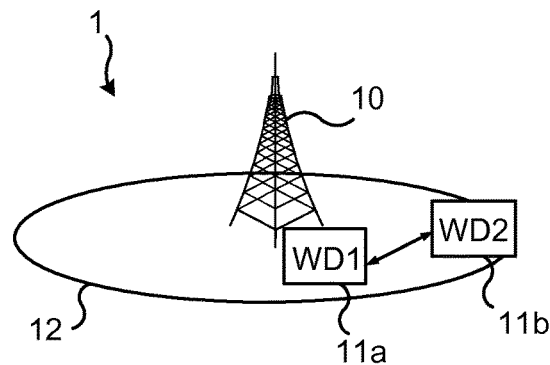
FIG. 1 schematically illustrates a scenario for device to device ProSe according to embodiments.

FIG. 1 schematically illustrates a scenario 1 for device to device ProSe where WD1 11a and WD2 11b are located within coverage of a cell 12 served by a network node 10. When WD1 has a role of transmission, WD1 sends discovery message and WD2 receives it. WD1 and WD2 may change their transmission and reception role. The transmission from WD1 may be received by one or more WDs like WD2.

Commonly, the use of ProSe Discovery must be authorised by the operator, and the authorisation can be on a "per WD" basis, or a "per WD per application" basis. An authorised application may interact with the ProSe Discovery feature to request the use of certain ProSe Discovery preferences.

In general terms, the network controls the use of E-UTRAN resources used for ProSe Discovery for a ProSe-enabled WD served by E-UTRAN.

In general terms, ProSe Discovery may be used as a standalone process (i.e. it is not necessarily followed by ProSe Communication) or as an enabler for other services.

Figure 2:
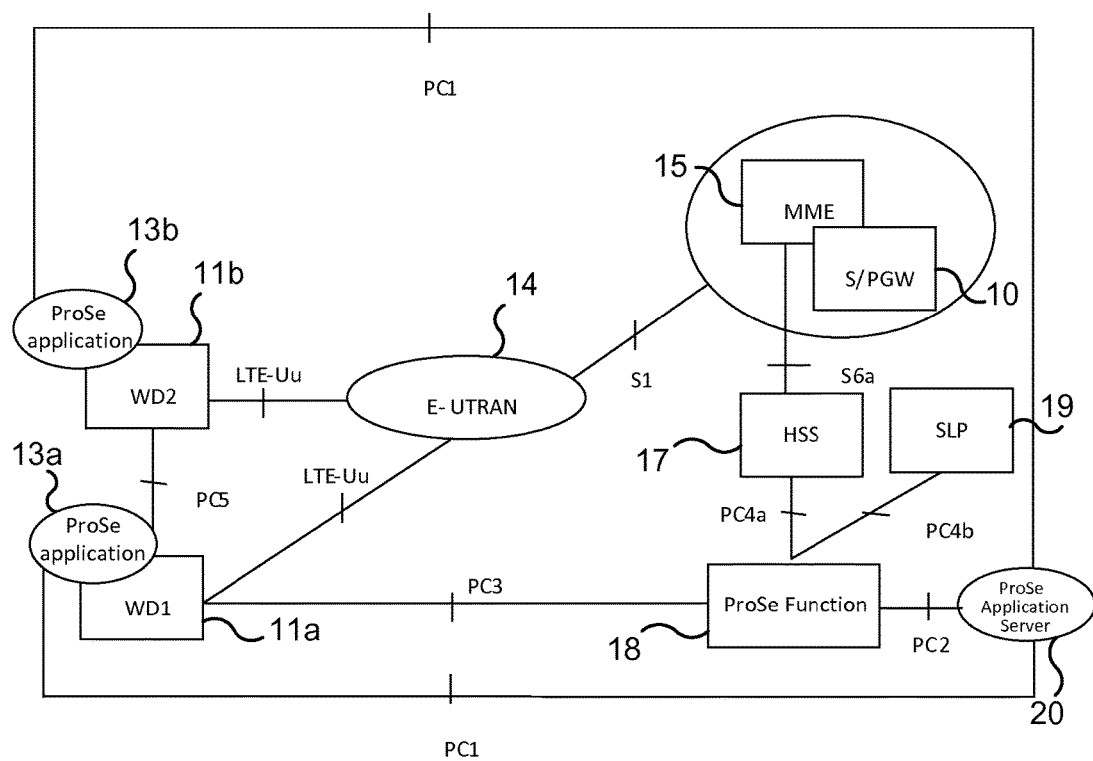
FIG. 2 schematically illustrates a high level view of a non-roaming architecture for a communications network according to embodiments.

FIG. 2 schematically illustrates a high level view of a non-roaming architecture for a communications network where embodiments presented herein may be applied. In FIG. 2, WD1 11a and WD2 11b use a subscription of the same PLMN. The communications network of FIG. 2 comprises an E-UTRAN 14. The communications network of FIG. 2 additionally comprises a number of functional nodes; HSS 17 is a Home Subscriber Server, MME 15 is a Mobility Management Entity, S/PGW 16 is a Serving Gateway and/or a Packet Data Network Gateway, and SLP 19 is a SUPL Location Platform (where SUPL is short for Secure User Plane Location). These functional nodes and their functionality are as such known in the art and a detailed description thereof is therefore omitted. The communications network of FIG. 2 further comprises a ProSe Function 18, and a ProSe Application Server 20. FIG. 2 also schematically illustrates some logical network interfaces; PC1, LTE-Uu, PC5, S1, PC3, S6a, PC4a, PC4b, and PC2 enabling communications between elements of the communications network and/or the wireless devices 11a, 11b. As schematically illustrated in FIG. 2 each wireless device 11a, 11b is associated with a ProSe application 13a, 13b.

Figure 3:
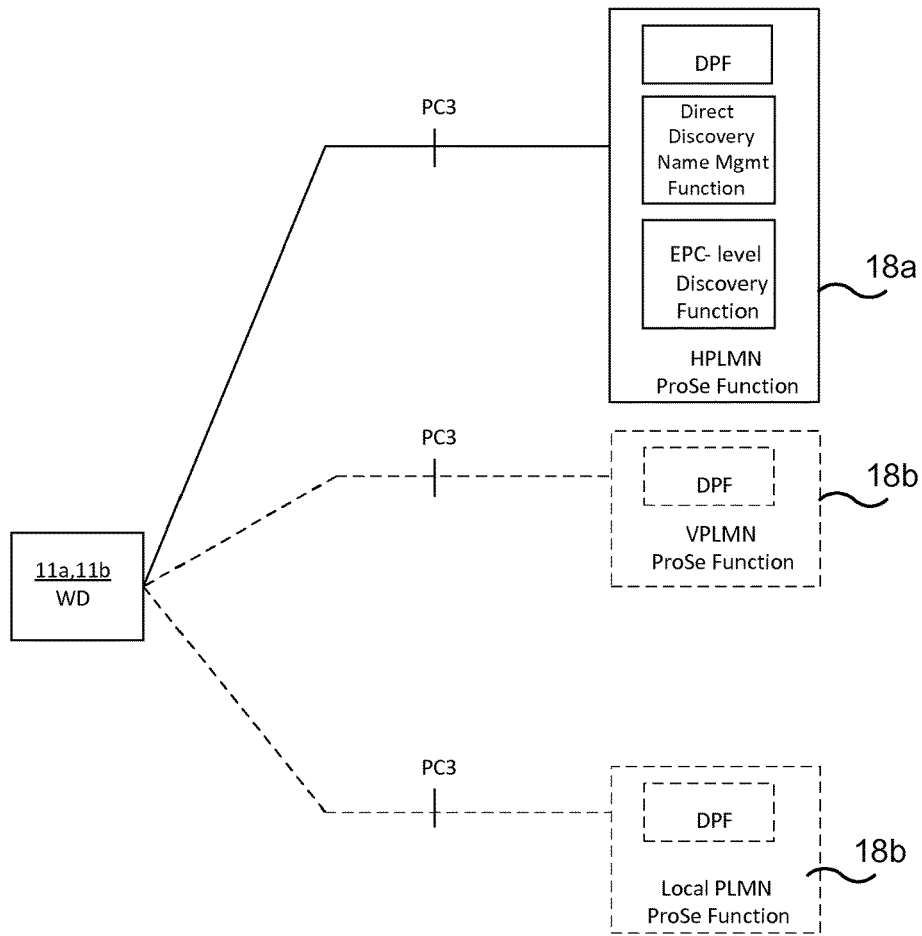
FIG. 3 schematically illustrates the WD-to-ProSe Function Interfaces according to embodiments.

FIG. 3 schematically illustrates the WD-to-ProSe Function Interfaces for each sub-function in the ProSe function. The ProSe Function may be regarded as the logical function that is used for network related actions required for ProSe. The ProSe Function may play different roles for each of the features of ProSe. Particularly, the wireless devices 11a, 11b have a PC3 interface to a HPLMN ProSE Function 18a, a VPLMN ProSe Function 18b, and a Local PLMN ProSE Function 18c. In some embodiments the ProSe Function 18b and the Local PLMN ProSE Function 18c are optional. The ProSe Function consists of main sub-functions that perform different roles depending on the ProSe feature. The Direct Provisioning Function (DPF) is used to provision the UE with necessary parameters in order to use ProSe Direct Discovery and ProSe Direct Communication. It is used to provision the UE's with PLMN specific parameters that allow the UE to use ProSe in this specific PLMN. Direct Discovery Name Management Function is used for open ProSe Direct Discovery to allocate and process the mapping of ProSe Application IDs and ProSe Application Codes used in ProSe Direct Discovery. It uses ProSe related subscriber data stored in HSS for authorization for each discovery request. It also provides the UE with necessary security material in order to protect discovery messages transmitted over the air.

Figure 4:
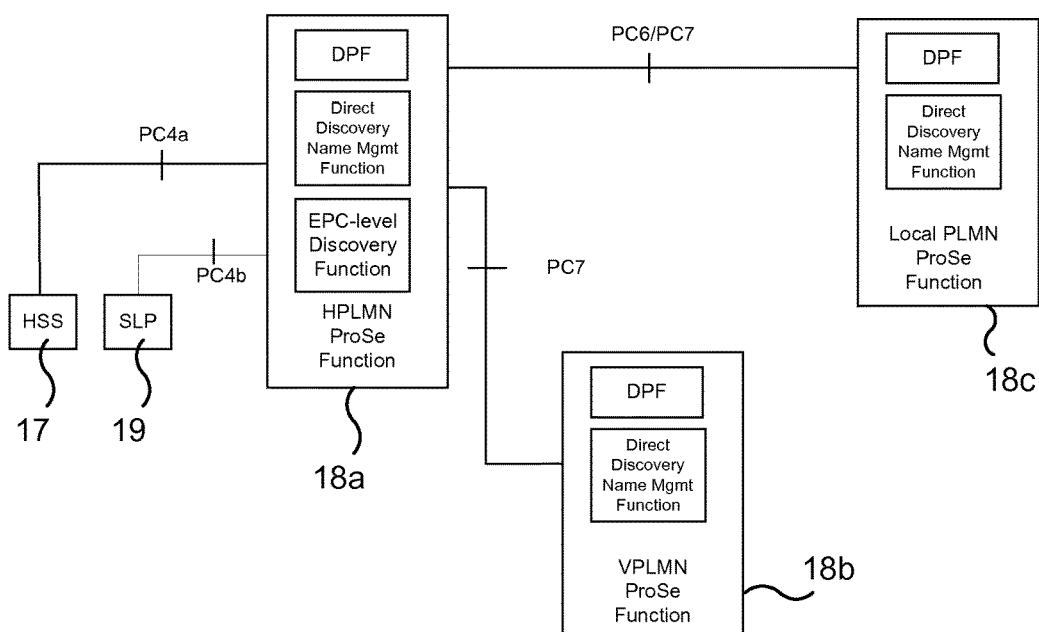
FIG. 4 schematically illustrates ProSe Function Interfaces according to embodiments.

FIG. 4 schematically illustrates ProSe Function Interfaces PC4a, PC4b, PC6, and PC7 to other network elements and PLMNs, where DPF is a Direct Provisioning Function. PC4a is used to provide subscription information in order to authorise access for ProSe Direct Discovery and ProSe Direct Communication on a per PLMN basis. PC6 is used between the ProSe Function in the HPLMN and the ProSe Function in a Local PLMN (ProSe Direct Discovery). With ProSe Direct Discovery this interface is used for HPLMN control of ProSe service authorization. It is also used to authorise ProSe Direct Discovery requests, retrieve the Discovery Filter(s) corresponding ProSe Application ID name(s) and translate the ProSe Application Code to the ProSe Application ID Name. PC7 is used between the ProSe Function in the HPLMN and the ProSe Function in the VPLMN. It is used for HPLMN control of ProSe service authorization. It is also used to authorise ProSe Direct Discovery requests, retrieve the Discovery Filter(s) corresponding ProSe Application ID name(s) and translate the ProSe Application Code to the ProSe Application ID Name.

The ProSe discovery procedure is described in 3GPP TS 23.303 'Technical Specification Group Services and System Aspects; Proximity based Services; Stage 2 (Release 12)'—V0.2.1, Sections: 4.2, 5.3.2, 5.3.3.

ProSe Direct Discovery may be provided as a standalone service enabler that for example may use information from the discovered WD for certain applications in the WD that are permitted to use this information e.g., "find a taxi nearby", "find me a coffee shop", etc. Additionally, for example depending on the information obtained, ProSe Direct Discovery may be used for subsequent actions e.g., to initiate ProSe Direct Communication.

Examples of two models for ProSe Direct Discovery will now be presented. The first is termed Model A and the second Model B.

Model A ("I am here"): This model generally defines two roles for the ProSe-enabled WDs that are participating in ProSe Direct Discovery. An Announcing WD is the WD that announces certain information that could be used by WDs in proximity that have permission to discover. A Monitoring WD is the WD that monitors certain information of interest in proximity of Announcing WDs. In this model the Announcing WD may broadcast discovery messages at pre-defined discovery intervals and the Monitoring WDs that are interested in these messages read them and process them.

Figure 5:
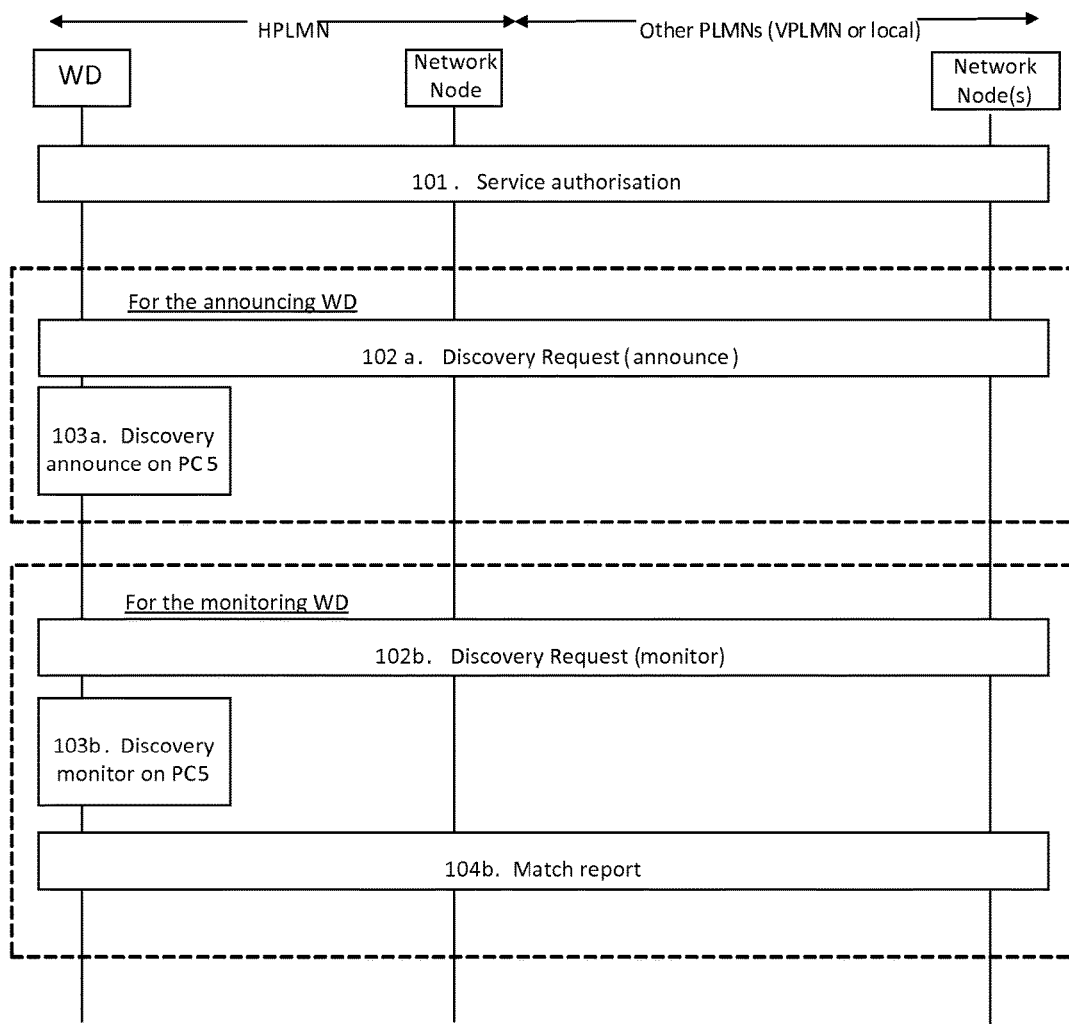
FIGS. 5, 7, 8, and 9 are signalling flow diagrams according to embodiments.

The overall procedure for ProSe Direct Discovery in Model A will now be disclosed in more detail with reference to the signalling flow diagram of FIG. 5. The overall procedure for ProSe Direct Discovery is described as follows in 3GPP TS 23.303 'Technical Specification Group Services and System Aspects; Proximity based Services; Stage 2 (Release 12)'—V0.2.1, Sections: 4.2, 5.3.2, 5.3.3 for Model A.

Step 101. Service authorisation for ProSe direct services is performed for ProSe Direct Discovery.

If the WD is authorized to announce:

Step 102a. When the Announcing WD is triggered to announce then it sends a discovery request for announcing to the ProSe Function in the home public land mobile network (HPLMN) of the Announcing WD.

Step 103a. If the request is successful and is provided with ProSe Application Code then the Announcing WD starts announcing on the PC5 interface.

If the Monitoring WD is authorized to monitor:

Step 102b. When the Monitoring WD is triggered to monitor, it sends a discovery request for monitoring to the ProSe.

Step 103b. If the request is successful and the Monitoring WD is provided with a Discovery Filter consisting of ProSe Application Code(s) or mask(s) it starts monitoring for these ProSe Application Codes on the PC5 interface.

Step 104b. When the Monitoring WD detects that one or more ProSe Application Code(s) that match the filter, it reports the ProSe Application Code(s) to the ProSe Function.

Model B ("who is there?"/"are you there?"): This model generally defines two roles for the ProSe-enabled WDs that are participating in ProSe Direct Discovery. The Discoverer WD transmits a request containing certain information about what it is interested to discover. The Discoveree WD receives the request message can respond with some information related to the request of the Discoverer WD. The Discoverer WD may thus transmit information about other WDs that it would like to receive responses from. The transmitted information may be about a ProSe Application Identifier corresponding to a group and the members of the group may thus respond.

No signaling flow for Model B has yet been approved to be included into 3GPP TS 23.303 'Technical Specification Group Services and System Aspects; Proximity based Services; Stage 2 (Release 12)'—V0.2.1, Sections: 4.2, 5.3.2, 5.3.3. However, the following model for ProSe Direct Discovery Model B has been included into 3GPP TR 23.703 'Technical Specification Group Services and System Aspects; Study on architecture enhancements to support Proximity-based Services (ProSe); (Release 12)'—V1.1.0, Sections 6.1.1.2.3.3. It is noted that this is one example of how the format for the Direct Discovery message could look like.

Figure 6:
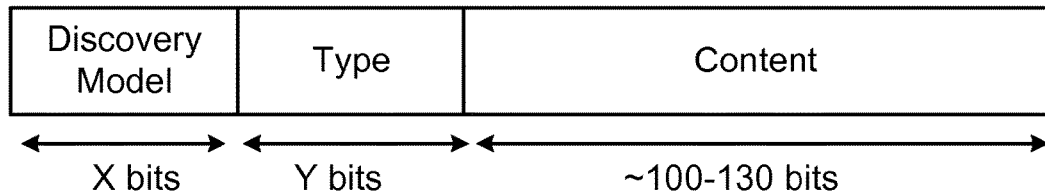
FIG. 6 schematically illustrates an example protocol format for direct discovery messages according to embodiments.

An example protocol format for direct discovery messages in the context of this proposal is presented in FIG. 6.

A Discovery Model field may indicate whether the message is for Model A ("I am here"), or Model B ("who is there"/"are you there").

A Type field may indicate whether the ProSe Identifier is a ProSe WD Identifier, and whether it is used for Open Discovery or Restricted Discovery.

A Content field may for example indicate at least one of the following (for example with the Type field set to 1): the ProSe WD Identifier or ProSe Group Identifier, (for example with the Type field set to 2): the ProSe Application Identifier, and (for example with the Type field set to 3): the ProSe Application Identifier and ProSe WD Identifier.

In general terms, if the WD or application is configured to support Model B discovery, it may announce a discovery message, for example indicating in the "Discovery model" field "Model B (request)" and carrying the Identities as described above.

For example, when the Type field is set to 3, the discovery message may comprise the ProSe Application Identifier in addition to the ProSe WD Identifier. In this case each of the recipient(s) of this message may respond with a discovery message with for example the "Discovery model" field set to "Model B (response)" and which message comprises the ProSe WD Identifier and/or the ProSe Application Identifier that was included in the request at the next discovery interval (if required based on the protocol design).

Alternatively, if the WD or application may support discovery using "Model A", the WD may announce a discovery message for example indicating in the "Discovery model" field "Model A" and the ProSe Application Identifier of its own.

If the Type field is set to "2" then the ProSe Application Identifier may be comprised in the content of the message.

If the Type field is set to "3" then the ProSe Application Identifier and ProSe WD Identifier may be comprised in the content of the message.

The Type filed may in these cases also be used in order to assist the processing of open or restricted discovery messages by the access stratum.

Some security aspects for the ProSe Discovery procedure will be summarized next.

A security solution has been provided for the ProSe Discovery procedure in 'Solution #2.5: Security for discovery with network checking' in 3GPP TR 33.833 'Technical Specification Group Services and System Aspects Study on security issues to support Proximity Services (Release 12)'—V0.4.0, section 6.2.5. This suggestion applies to 'Model A'. This suggestion is described below in this section.

Figure 7:
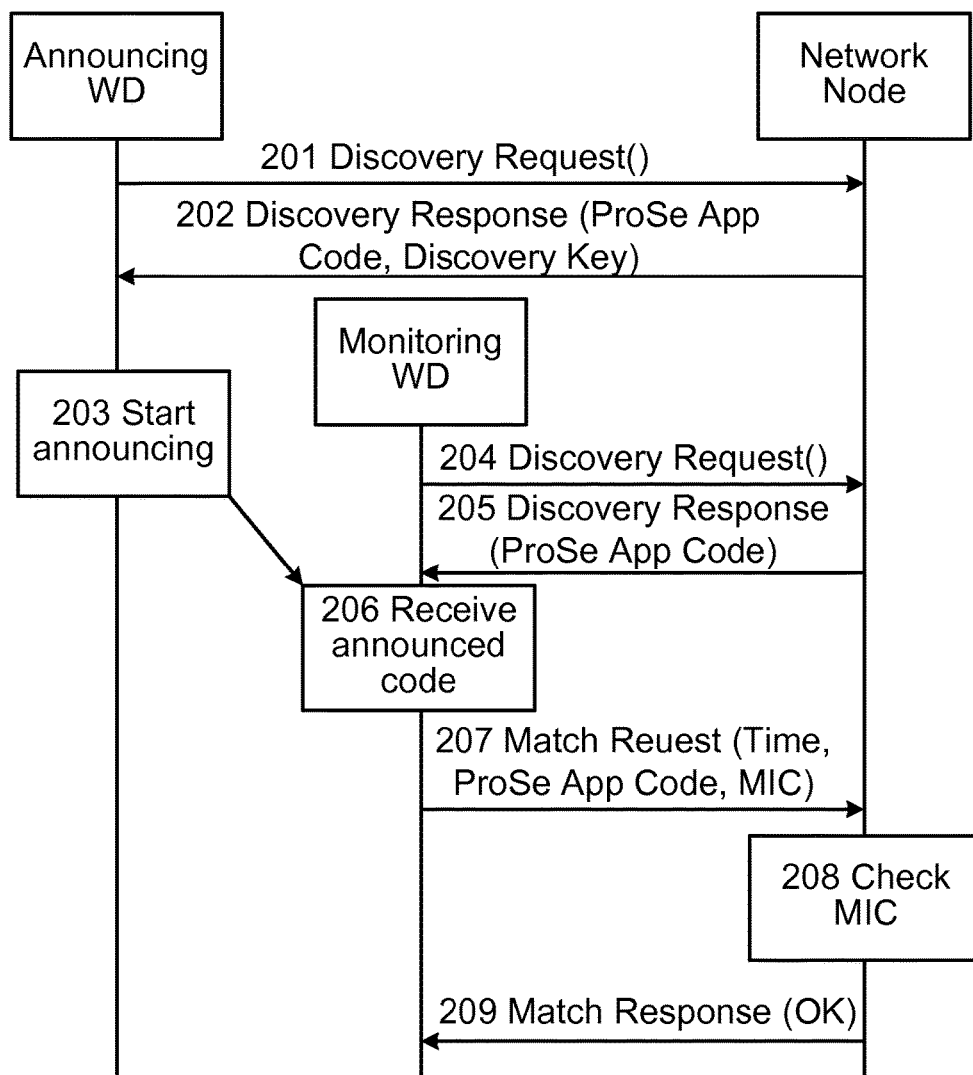

In Model A the announced code is integrity protected as shows in the signalling flow diagram of FIG. 7. It is assumed that there is a "time value" parameter available to both the WDs. The possible multiple ProSe Functions have also been collapsed into one logical element as it does not affect the security here, so in effect the signalling flow diagram represents both the Announcing WD and Monitoring WD being in their home network.

Step 201. The Announcing WD transmits a Discovery Request message to the ProSe Function in order to be allowed to announce code on that PLMN.

Step 202. The ProSe function returns the ProSe App Code that the announcing WD can announce and a Discovery Key associated with it. The ProSe Function stores the Discovery Key with the ProSe App Code.

Step 203. The Announcing WD starts announcing. In each slot that it announces, the Announcing WD calculates a Message Integrity Code (MIC) to append to the ProSe App Code, so that the announced code becomes the ProSe App Code plus the MIC. The MIC is generally calculated using the key derivation function (KDF) described in 3GPP TS 33.220 'Technical Specification Group Services and System Aspects; Generic Authentication Architecture (GAA); Generic Bootstrapping Architecture (GBA) (Release 12)'—V12.1.0, section Annex B with the Discovery Key as the key and the "time value" parameter and the ProSe App Code as the other inputs.

Step 204. The Monitoring WD transmits a Discovery Request message to the ProSe Function in order to get the ProSe App Code that it wants to listen for.

Step 205. The ProSe Function returns the ProSe App Code.

Step 206. The Monitoring WD listens for announced codes that contain a ProSe App Code that it is interested in.

Step 207. On hearing such an announced code, the Monitoring WD transmits a Match Request message to the ProSe function containing the 'time value' parameter related to the slot it heard the announcement in and the announced code, i.e. the ProSe App Code and the MIC.

Step 208. The ProSe Function checks if the MIC is valid. The relevant Discovery Key is found using the ProSe App Code.

Step 209. The ProSe Function returns an acknowledgement that the integrity check has passed to the Monitoring WD.

As noted above, in Model B the Discoverer WD transmits information (such as a direct discovery request message) about other WDs that it would like to receive responses from. When the Discoveree WD listens to Direct Discovery Request messages (e.g., on broadcast channels) and discovers a code or an identifier that the Discoveree WD is interested in, then the Discoveree WD replies by announcing a Direct Discovery Response message. However, when the Discoverer WD receives the Direct Discovery Response message, it is today not possible for the Discoverer WD to be able to determine whether the responding WD is a genuine WD, i.e., a WD authorized to respond to the Direct Discovery request message or not. It could happen that a false Discoveree WD could fool the Discoverer WD that the false Discoveree WD is a genuine Discoveree WD which is currently located in proximity of the Discoverer WD. Also replay attacks where, for example, a false Discoveree WD is replaying genuine Direct Discovery response messages may occur. Such issues are not described in 3GPP TR 33.833 'Technical Specification Group Services and System Aspects Study on security issues to support Proximity Services (Release 12)'—V0.4.0, section 6.2.5.

The embodiments disclosed herein relate to secure device to device discovery, and particularly to authentication in device to device discovery. In order to obtain authentication in device to device discovery there is provided a wireless device acting either as a Discoverer WD or a Discoveree WD, a network node, methods performed by the Discoverer WD, the Discoveree WD, and the network node, and computer programs comprising code, for example in the form of computer program products, that when run on the wireless device and/or the network node causes the wireless device and/or the network node to perform the methods.

Figure 11:
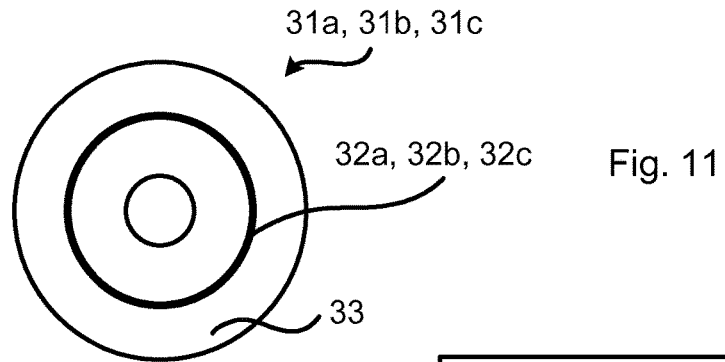
FIG. 11 shows one example of a computer program product comprising computer readable means according to an embodiment.
Figure 12:
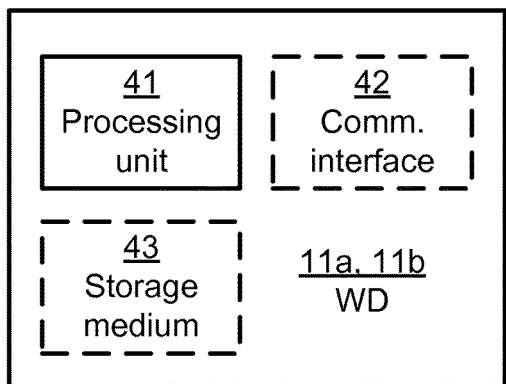
FIG. 12 schematically illustrates functional units of a wireless device according to an embodiment.

FIG. 12 schematically illustrates, in terms of a number of functional units, the components of a wireless device acting either as a Discoverer WD 11a or a Discoveree WD 11b according to an embodiment. The wireless device may be configured to run a ProSe application 13a, 13b. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 11), e.g. in the form of a storage medium 43. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The wireless device further comprises a communications interface 42 for communications with a further wireless device and a network node 12. As such the communications interface 42 may comprise one or more transmitters and receivers, comprising analogue and digital components and a suitable number of antennae for radio communications. The processing unit 42 controls the general operation of the wireless device e.g. by sending data and control signals to the communications interface 42 and the storage medium 43, by receiving data and reports from the communications interface 42, and by retrieving data and instructions from the storage medium 43. Other components, as well as the related functionality, of the wireless device are omitted in order not to obscure the concepts presented herein.

Figure 13:
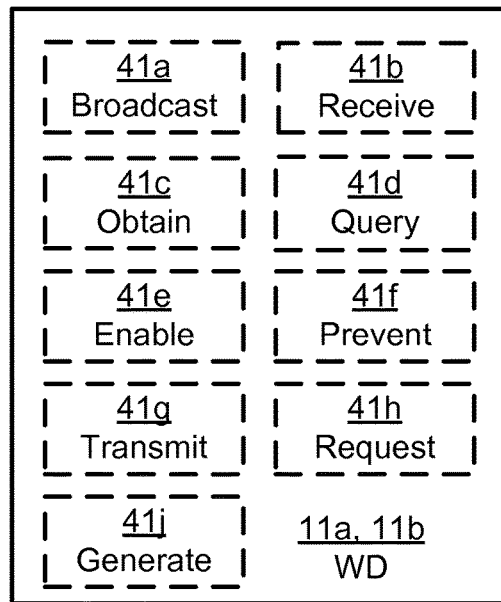
FIG. 13 schematically illustrates functional modules of a wireless device according to an embodiment.

FIG. 13 schematically illustrates, in terms of a number of functional modules, the components of a wireless device acting either as a Discoverer WD 11a or a Discoveree WD 11b according to an embodiment. The wireless device of FIG. 13 comprises a number of functional modules, such as any of a broadcast module 41a, a receive module 41b, an obtain module 41c, a query module 41d, an enable module 41e, a prevent module 41f, a transmit module 41g, a request module 41h, and a generate module 41j. The functionality of each functional module 41a-j will be further disclosed below in the context of which the functional modules 41a-j may be used. In general terms, each functional module 41a-j may be implemented in hardware or in software. The processing unit 41 may thus be arranged to from the storage medium 43 fetch instructions as provided by a functional module 41a-j and to execute these instructions, thereby performing any steps as will be disclosed hereinafter.

Figure 14:
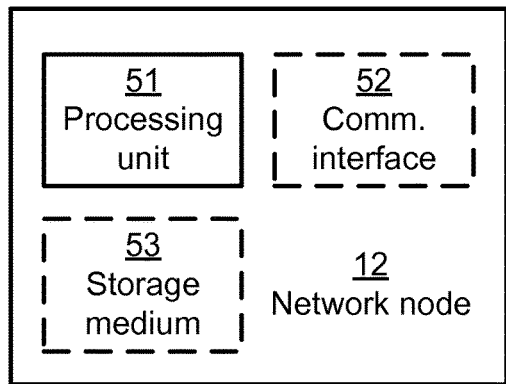
FIG. 14 schematically illustrates functional units of a network node according to an embodiment.

FIG. 14 schematically illustrates, in terms of a number of functional units, the components of a network node 12 according to an embodiment. The network node may implement the functionality of at least one of the ProSe Function 18 and the ProSe application server 20. A processing unit 51 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31c (as in FIG. 11), e.g. in the form of a storage medium 53. Thus the processing unit 51 is thereby arranged to execute methods as herein disclosed. The storage medium 53 may also comprise persistent storage, which, for example, can be any single one or combination of magnetic memory, optical memory, solid state memory or even remotely mounted memory. The network node further comprises a communications interface 52 for communications with another network node, and at least one wireless device, for example a wireless device acting as a Discoverer WD and a wireless device acting as a Discoveree WD. As such the communications interface 52 may comprise one or more transmitters and receivers, comprising analogue and digital components and a suitable number of antennae for radio communications. The processing unit 51 controls the general operation of the network node e.g. by sending data and control signals to the communications interface 52 and the storage medium 53, by receiving data and reports from the communications interface 52, and by retrieving data and instructions from the storage medium 53. Other components, as well as the related functionality, of the network node are omitted in order not to obscure the concepts presented herein.

Figure 15:
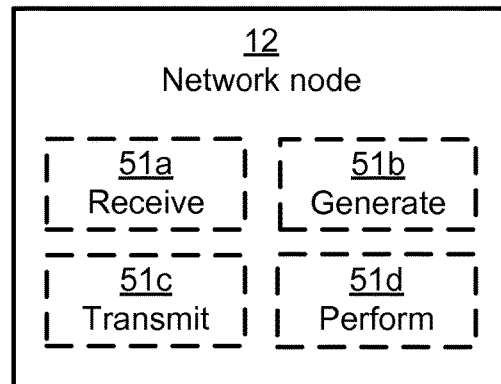
FIG. 15 schematically illustrates functional modules of a network node according to an embodiment.

FIG. 15 schematically illustrates, in terms of a number of functional modules, the components of a network node 12 according to an embodiment. The network node of FIG. 15 comprises a number of functional modules, such as any of a receive module 51a, a generate module 51b, a transmit module sic, and a perform module 51d. The functionality of each functional module 5a-d will be further disclosed below in the context of which the functional modules 51a-d may be used. In general terms, each functional module 51a-d may be implemented in hardware or in software. The processing unit 51 may thus be arranged to from the storage medium 53 fetch instructions as provided by a functional module 51a-d and to execute these instructions, thereby performing any steps as will be disclosed hereinafter.

Figure 10:
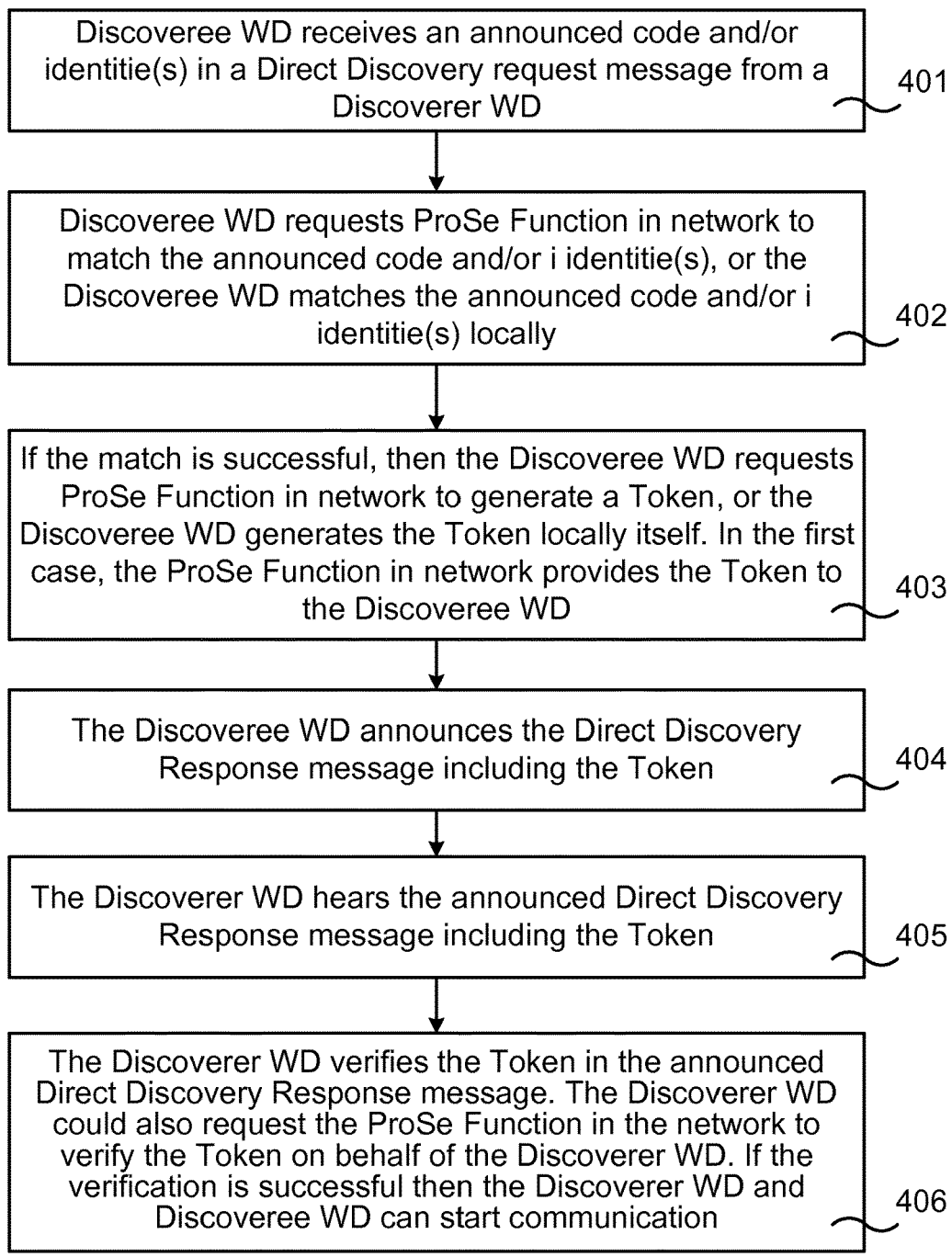
FIGS. 10, 16, 17, and 18 are flowcharts of methods according to embodiments.
Figure 16:
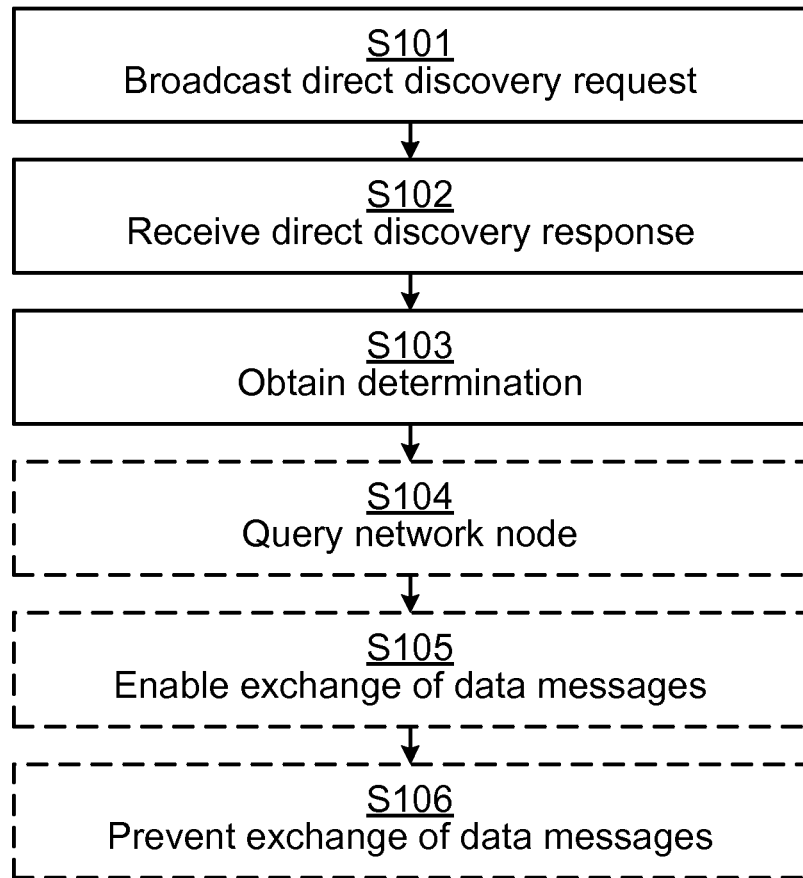
Figure 17:
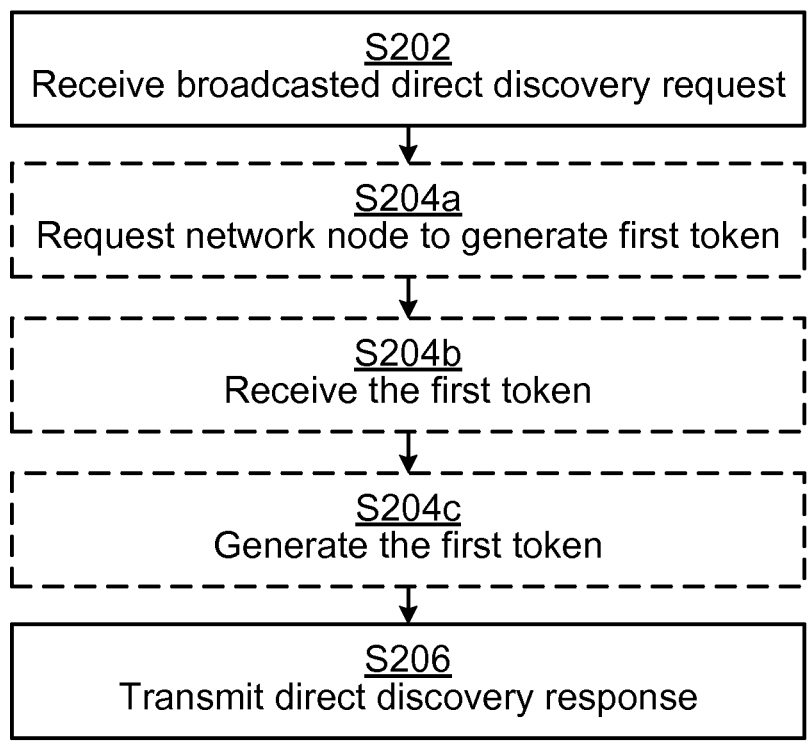
Figure 18:
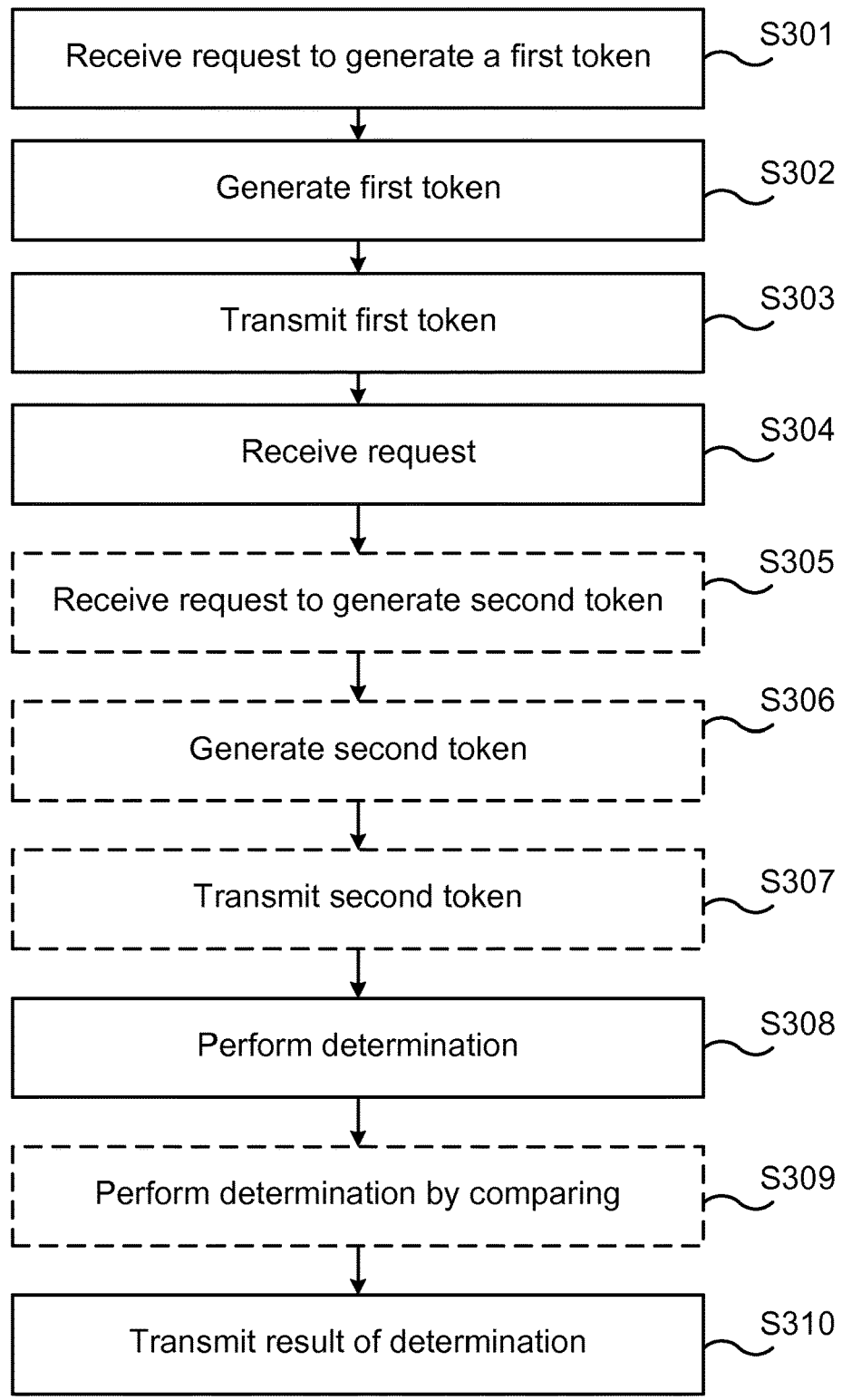

FIGS. 10, 16, 17, and 18 are flow chart illustrating embodiments of methods for authentication in device to device discovery. The methods of FIGS. 10 and 16 are performed by the wireless device acting as a Discoverer WD. The methods of FIGS. 10 and 17 are performed by the wireless device acting as a Discoveree WD. The methods of FIGS. 10 and 18 are performed by the network node.

The methods are advantageously provided as computer programs 32a, 32b, 32c. FIG. 11 shows one example of a computer program product 31a, 31b, 31c comprising computer readable means 33. On this computer readable means 33, at least one computer program 32a, 32b, 32c can be stored, which at least one computer program 32a, 32b, 32c can cause the processing units 41, 51 and thereto operatively coupled entities and devices, such as the communications interfaces 42, 52 and the storage medium 43, 53, to execute methods according to embodiments described herein. The at least one computer program 32a, 32b, 32c and/or computer program products 31a, 31b, 31c may thus provide means for performing any steps as herein disclosed.

In the example of FIG. 11, the computer program product 31a, 31b, 31c is illustrated as an optical disc, such as a CD (compact disc) or a DVD (digital versatile disc) or a Blu-Ray disc. The computer program product 31a, 31b, 31c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer programs 32a, 32b, 32c are here schematically shown as a track on the depicted optical disk, the computer programs 32a, 32b, 32c can be stored in any way which is suitable for the computer program product 31a, 31b, 31c.

Reference is now made to FIG. 16 illustrating a method for authentication in device to device discovery as performed by a Discoverer device according to an embodiment.

According to some embodiments the Discoverer device is configured to, in a step S101, broadcast a direct discovery request. According to some embodiments the Discoverer device is configured to, in a step S102, receive a direct discovery response from a Discoveree device. The direct discovery response comprises a first token.

Thus, when the Discoverer WD wishes to discover other WDs (Discoveree WDs) in its vicinity, it broadcasts a Direct Discovery Request message. The Discoveree WD(s) process the Direct Discovery Request message and based on the information in the Direct Discovery Request message the Discoveree WDs may decide to respond with a Direct Discovery Response message.

When the Discoverer WD receives the Direct Discovery Response message, then the Discoverer WD may need to ensure that the Discoveree WD is genuine and that the Discovery response message is not replayed by a false WD, and the Discoverer WD, and/or may need to ensure that the Discoveree WD is authorized by the ProSe Function in the network to respond to the announced Discovery request message.

According to herein disclosed embodiments a Token (a first token) is included in the Direct Discovery Response message from the Discoveree WDs to the Discoverer WD. According to some embodiments the Discoverer device is configured to, in a step S103, obtain a determination of whether the first token was generated for the Discoveree device or not.

Figure 8:
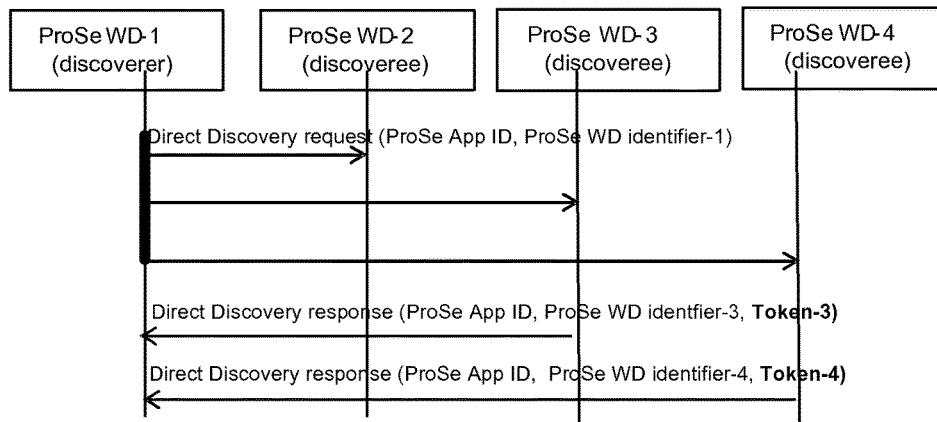

FIG. 8 schematically illustrates a signalling flow diagram for authentication in device to device discovery involving one Discoverer WD1 and three Discoveree WD2, WD3, WD4, where Discoveree WD3 and WD4 respond to an announced Discovery request message from the Discoverer WD1 with respective identifiers and Tokens. In the example in FIG. 8, the Model B ("who is there"/"are you there") is used. The Discoverer WD transmits a ProSe Application ID and its identity in the Direct Discovery Request message. When the Discoveree WD2 or Discoveree WD3 or Discoveree WD4 listens to the Direct Discovery Request messages and discovers a ProSe Application ID that the Discoveree WD is interested in, then the Discoveree WD replies by announcing a Direct Discovery Response message. In order for the Discoverer WD to determine whether the responding WD is a genuine WD, the responding Discoveree WD includes a Token together with the ProSe Application ID and the identifier of the responding Discoveree WD.

Reference is now continued to FIG. 16.

The Discoverer device may optionally be configured to, in a step S105, and if determined that the first token was generated for the Discoveree device, enable exchange of data messages in direct communication with the Discoveree device.

The Discoverer device may optionally be configured to, in a step S106, and if determined that the first token was not generated for the Discoveree device, prevent exchange of data messages in direct communication with the Discoveree device.

There may be different ways relating to which device to generate the Token. For example the first token may be generated by a network node. The ProSe Function in the network may thus determine a Token which it provides to the Discoveree WD. The Discoveree WD then includes the Token to the Discoverer WD in Direct Discovery Response message. For example the first token may be generated by the Discoveree device. The Discoveree WD may thus generate the Token itself. The Discoveree WD then includes the Token in the Discovery response message back to the Discoverer WD in Direct Discovery Response message.

As noted above, the Discoverer WD receives the Direct Discovery Response message. The Discoverer WD needs to check the Token included in the Direct Discovery Response message.

The check of the Token may comprise determining a Token (a second token) for the Discoverer WD in the same way as for the Discoveree WD. The second token may be generated by a network node. The second token may be generated by the Discoverer device.

The Token for the Discoverer WD may be compared to the Token received in the Direct Discovery Response message. Hence the determination may comprise comparing the first token of the Discoveree WD to a second token of the Discoverer device.

If the two Tokens are equal then the Direct Discovery Response message is genuine. If the two Tokens are equal then the Discoverer WD knows that the Direct Discovery Response message is genuine which means that the Discoveree WD is genuine and authorized to respond and the Direct Discovery Response message is not a replayed Direct Discovery Response message.

There may be different ways relating to which device to compare the Tokens.

The determination may be generated by the Discoverer device. The Discoverer WD may thus generate its own Token and compare it with the broadcasted Token in the Discovery response message. Alternatively the generation of the determination may comprise the Discoverer device to, in an optional step S104, query a network node to decide whether the first token was generated for the Discoveree device or not. The Discoverer WD may thus request the ProSe Function in the network to determine the Token of the Discoverer WD and compare the two Tokens on behalf of the Discoveree WD. The ProSe Function in the network then informs the Discoverer WD if the check of the Token was successful.

Encryption may be applied to at least one of the direct discovery response and the direct discovery request. Details thereof will now be disclosed in turn.

In general terms, a Token would not provide privacy to broadcasted identifiers in the Direct Discovery Response message, particularly not in Model B. Privacy could be provided by supporting encryption of the identifier(s).

For example, the direct discovery response may comprise at least two broadcasted identifiers, one of which is encrypted. Thus, if there are two broadcasted identifier(s) in the Direct Discovery Response message, for example a ProSe Application Identifier and a ProSe WD Identifier of the Discoveree WD, then it may be possible to encrypt the ProSe WD Identifier of the Discoveree WD, since the Discoverer WD may be able to filter out the Direct Discovery Response messages it is interested in by monitoring the ProSe Application Identifier.

For example, the direct discovery request may comprise at least two broadcasted identifiers, one of which is encrypted. Thus, if there are two or more broadcasted identifier(s) in the Direct Discovery Request message, for example a ProSe Application Identifier and a ProSe WD Identifier of the Discoverer WD, then it may be possible to encrypt the ProSe WD Identifier of the Discoverer WD, since the Discoveree WD may be able to filter out the Direct Discovery Request messages it is interested in by monitoring the ProSe Application Identifier which it is interested in.

Reference is now made to FIG. 17 illustrating a method for authentication in device to device discovery as performed by a Discoveree device according to an embodiment.

According to some embodiments the Discoveree device is configured to, in a step S202, receive a broadcasted direct discovery request from a Discoverer device. According to some embodiments the Discoveree device is configured to, in a step S206, transmit a direct discovery response to the Discoverer device. The direct discovery response comprises a first token.

The Discoveree device may optionally be configured to, in a step S204a, request a network node to generate the first token. The Discoveree device may then be configured to, in a step S204b, receiving the first token from the network node prior to transmitting the direct discovery response.

Alternatively the Discoveree device may optionally be configured to, in a step S204c, generate the first token prior to transmitting the direct discovery response.

Reference is now made to FIG. 18 illustrating a method for authentication in device to device discovery as performed by a network node according to an embodiment.

According to some embodiments the network node is configured to, in a step S301, receive a request to generate a first token from a Discoveree device. According to some embodiments the network node is configured to, in a step S302, generate the first token. According to some embodiments the network node is configured to, in a step S303, transmit the first token to the Discoveree device. According to some embodiments the network node is configured to, in a step S304, receive a request from a Discoverer device to determine whether the first token was generated for the Discoveree device or not. According to some embodiments the network node is configured to, in a step S308, perform a determination of whether the first token was generated for the Discoveree device or not. According to some embodiments the network node is configured to, in a step S310, transmit a result thereof to the Discoverer device.

The network node may optionally be configured to, in a step S305, receive a request to generate a second token from the Discoverer device. The network node may optionally be configured to, in a step S306, generate the second token. The network node may optionally be configured to, in a step S309, performing the determination by comparing the first token to the second token. The network node may optionally be configured to, in a step S307, transmit the second token to the Discoverer device.

Particular details of the first (and optionally the second token) will now be disclosed in more detail. However, as the skilled person understands, these are just examples of tokens which may be readily used for authentication in device to device discovery as disclosed herein.

Based on the Direct Discovery Request message format as for example described in 3GPP TR 23.703 'Technical Specification Group Services and System Aspects; Study on architecture enhancements to support Proximity-based Services (ProSe); (Release 12)'—Section 6.1.1.2.3.3, it may be assumed that the Direct Discovery Request message in Model B for example could indicate any of the combinations of identifiers presented in Table 1.

TABLE 1

Examples of identifiers in Direct Discovery Request messages in Model B

| | |
|---|---|
| 1) | ProSe WD Identifier of Discoveree WD |
| 2) | ProSe Group Identifier of the group of Discoveree WDs |
| 3) | ProSe Application Identifier |
| 4) | ProSe Application Code |
| 5) | ProSe Application Identifier and ProSe WD Identifier of Discoverer WD |
| 6) | ProSe Application Code and ProSe WD Identifier of Discoverer WD |
| 7) | ProSe Application Identifier and ProSe Group Identifier of the group of Discoverer WD and Discoveree WDs |
| 8) | ProSe Application Code and ProSe Group Identifier of the group of Discoverer WD and Discoveree WDs |

According to items 1), 2), 3), and 4) in Table 1 the identifier of the Discoverer WD (i.e., the ProSe WD Identifier of Discoverer WD) is not broadcasted.

According to items 5), and 6) in Table 1 the identifier of the Discoverer WD (i.e., the ProSe WD identifier of Discoverer WD) is broadcasted.

According to item 4) in Table 1 the Discoveree WD may check with the ProSe Function in the network whether the broadcasted ProSe Application Code (ProSe App Code) origins from an authorized Discoverer WD and also find out the identifier of the Discoverer WD from the ProSe Function in the network.

The format for the Direct Discovery Response message in Model B is not described in any 3GPP specification. Without loss of generality it is assumed that the Direct Discovery Response message for example may indicate any of the following combinations of identities presented in Table 2.

TABLE 2

Examples of identities included in Direct Discovery Response message in Model B

| | |
|---|---|
| 1) | ProSe WD Identifier of Discoveree WD |
| 2a) | ProSe Group member Identifier of the Discoveree WD |
| 2b) | ProSe WD Identifier of Discoveree WD |
| 3a) | ProSe Application Identifier and ProSe WD Identifier of Discoveree WD |
| 3b) | ProSe Application Identifier and ProSe Group member Identifier of Discoveree WD |
| 4a) | ProSe Application Code and ProSe WD Identifier of Discoveree WD |
| 4b) | ProSe Application Code and ProSe Group member Identifier of Discoveree WD |

TABLE 2-continued

Examples of identities included in Direct Discovery Response
message in Model B

5) ProSe Application Identifier and
ProSe WD Identifier of Discoveree WD
6) ProSe Application Code and
ProSe WD Identifier of Discoveree WD
7) ProSe Application Identifier and
ProSe Group member Identifier of the Discoveree WD
8) ProSe Application Code and
ProSe Group member Identifier of the Discoveree WD The token may comprise a message authentication code (MAC). The MAC may be a function of any combination of a First parameter, a Second parameter, a Third parameter, and a Fourth parameter.

One purpose of the First parameter may be to provide a freshness indication. Examples of parameters which could provide this include, but are not limited to, a ProSe App Code, a time stamp, a time value, a counter value. The ProSe App Code could for example provide freshness in a time window. The ProSe App Code may be generated by the ProSe function in the network and may have an associated validity timer. When the validity timer expires then the ProSe App Code is no longer valid. Any freshness indication may be initialized upon generation of the token.

One purpose of the Second parameter may be to make it difficult to forge tokens. Examples of parameters which could be used for the Second parameter include, but are not limited to, a Discovery security key, a Group security key, and any security key shared between Discoverer WD and Discoveree WD. The Discovery security key may be shared by the Discoverer WD and the ProSe function in the network; or the Discovery key may be shared by the Discoverer WD and the Discoveree WD. The Group key may be shared by all the Group members part of the same Group.

One purpose of the Third parameter may be to make the token unique per Discoveree WD. Examples of parameters which could be used for the Third parameter include, but are not limited to a Discoveree WD identifier as ProSe WD identifier, a Discoveree WD identifier as ProSe Group member identifier, a group member within a Group identified by a Group identifier, and any other Discoveree WD identifier.

One purpose of the Fourth parameter may be to map the Direct Discovery Response to the Direct Discovery Request. Some examples of the Fourth parameter will be provided next. The ProSe App Code included in the Direct Discovery Request message. Note that if the ProSe App Code has been used as the First parameter then it may not be needed to be included twice. The ProSe Group identifier included in the Direct Discovery Request message. The ProSe Application Identifier included in the Direct Discovery Request message. Any combination of ProSe Application identifier and ProSe Group identifier. Any combination of ProSe App Code and ProSe Group identifier. Any other identifier included in the Direct Discovery Request message.

Particular embodiments relating to authentication in device to device discovery will now be disclosed in more detail.

Further details of Direct Discovery Response messages will now be disclosed. It is without loss of generality assumed that Model B is used and that a Discoveree WD listens to broadcasted Direct Discovery Request messages announcing a code and/or identifier(s). In general terms, when the Discoveree WD is hearing a code or identifier in the message which it is interested in, it is assumed that the Discoveree WD would like to respond back to the Discoverer WD with a Direct Discovery Response message including a Token.

According to embodiments (hereinafter denoted Embodiment 1) the Discoveree WD contacts the ProSe Function in the network, requesting the ProSe function to check whether the Direct Discovery Request message is broadcasted by an authorized Discoverer WD. If the ProSe Function in the network determines that the Discoverer WD is genuine, and determines that the Discoveree WD is allowed to respond to the Direct Discovery Request message, then the ProSe Function generates a Token by using a shared security key (for example a Discovery security key, a Group security key or any other security key) which the ProSe Function in the network shares with the Discoverer WD. The Token may comprise a MAC determined over a defined number of parameters, known by the ProSe Function in the network and also known by the Discoverer WD. The Token may be generated in many different ways, for example as described above. The ProSe Function in the network provides the Token to the Discoveree WD. The Discoveree WD broadcasts the Direct Discovery Response message including the Token. The Discoverer WD hears the Direct Discovery Response message including the Token.

There are at least two different variants of how the Discoverer WD continues when it hears the Direct Discovery Response message including the Token, which it is interested in.

According to embodiments (hereinafter denoted Embodiment 2) the Discoveree WD checks whether the Direct Discovery Request message is broadcasted by an authorized Discoverer WD. If the Discoveree WD determines that the Discoverer WD is genuine, then the Discoveree WD generates a Token by using a shared security key which the Discoveree WD shares with the Discoverer WD. The Token may comprise a MAC determined over a defined number of parameters, known by the Discoveree WD and also known by the Discoverer WD. The Token may be generated in many different ways, for example as described above. The Discoveree WD broadcasts the Direct Discovery Response message including the Token. The Discoverer WD hears the Direct Discovery Response message including the Token.

There are at least two different variants of how the Discoverer WD continues when it hears the Direct Discovery Response message including the Token, which it is interested in.

According to embodiments (hereinafter denoted Embodiment 3) the Discoverer WD determines the MAC over a defined number of parameters (for example the same parameters as used by the ProSe Function in the network), and the Discoverer WD compares the calculated MAC with the MAC in the Token. If the both MAC's are equal, then the Discoverer WD knows that the Discoveree WD transmitting the Direct Discovery Response message is genuine and authorized by the ProSe Function in the network to respond to the original Direct Discovery request message. The Discoverer WD knows now that the Discoveree WD is within proximity, and may take any appropriate action e.g., initiate direct communication with the Discoveree WD.

According to embodiments (hereinafter denoted Embodiment 4) the Discoverer WD requests the ProSe Function in the network to verify the Token by forwarding the Direct Discovery response message including the Token to the ProSe Function in the network. The ProSe Function in the network determines the MAC over a defined number of parameters (for example the same parameters as used by the ProSe Function in the network when determining the Token on behalf of the Discoveree WD). The ProSe Function in the network then compares the calculated MAC with the MAC in the Token. If the both MACs are equal, then the ProSe Function in the network knows that the Discoveree WD transmitting the Direct Discovery Response message is genuine and authorized by the ProSe Function in the network to respond to the original Direct Discovery Request message. The ProSe Function in the network informs the Discoverer WD that the Discoveree WD is genuine. The Discoverer WD knows now that the Discoveree WD is within proximity, and may take any appropriate action e.g., initiate direct communication with the Discoveree WD.

A detailed signaling flow diagram based on Embodiment 1, 2, 3, and 4 is provided in FIG. 9 and comprises steps as will be discussed below. Reference is also made to the flowchart of FIG. 10 based on Embodiment 1, 2, 3, and 4.

First optional step (not illustrated in the FIG.): A shared security key, for example a Discovery key or Group key, may be pre-configured or provisioned in the Discoverer WD.

Second optional step (not illustrate in the FIG.: A shared security key, for example a Discovery key or Group key, may be pre-configured or provisioned in the Discoveree WD.

Step 301. Optional step: The Discoverer WD may transmit a Discovery Request message to the ProSe Function in order to request to be allowed to announce one or more identifiers/codes on that PLMN. The ProSe function may return the Discovery Response message (containing for example a ProSe App Code or an application Identifier or any other identifier) that the Discoverer WD is allowed to announce and may also include an associated security key (for example a Discovery Key, a Group Key or some other security key). The ProSe Function may store the Discovery Key together with the Discovery Request message.

Step 302. Optional step: The Discoveree WD transmits a Discovery Request message to the ProSe Function in the network in order to obtain a code and/or identifier(s) that it wants to listen for. The ProSe Function in the network returns the code and/or identifier(s) to the Discoveree WD.

Step 303. The Discoverer WD starts announcing (broadcasting) the Direct Discovery Request message.

Step 304. The Discoveree WD listens for announced (broadcasted) information that comprises a code and/or identifier(s) that the Discoveree WD is interested in.

Now either steps 305, 306, 307, 309, 310; or steps 305, 306, 307 (except for Embodiment 1), 308, 309, 310; or steps 308, 309, 310 take place.

Step 305. Upon hearing such an announced code or identifier, the Discoveree WD sends a Found Match Request message to the ProSe function with the Direct Discovery Request message comprising the code and/or identifier(s). The Discoveree WD may also transmit an indication that it wants to use, for example, Model B and announces (broadcasts) a Direct Discovery Response message.

Step 306. The ProSe Function in the network verifies the received code and/or identifier(s). If the verification is successful, then, according to Embodiment 1, the ProSe Function in the network generates a Token using a security key (for example a Discovery Key, a Group Key or some other security key).

Step 307. The ProSe Function informs the Discoveree WD that the match of the Direct Discovery Request message was successful. The ProSe Function, according to Embodiment 1, provides the Token to the Discoveree WD.

Step 308. Upon hearing such an announced code or identifier in step 304, the Discoveree WD, according to Embodiment 2, verifies the received code and/or identifier(s) and if verification is successful, then the Discoveree WD generates a Token; or if the ProSe Function in step 307 informs the Discoveree WD that the match of the Direct Discovery Request message was successful, then the Discoveree WD, according to Embodiment 2, generates a Token.

Step 309. The Discoveree WD starts to announce (broadcast) the Direct Discovery Response message comprising the Token.

Step 310. The Discoverer WD listens for Direct Discovery Response messages and receives the Direct Discovery Response message including the Token which it is interested in.

Now either step 311 or 312 takes place.

Step 311. The Discoverer WD, according to Embodiment 3, verifies the Token using the shared secret key (for example a Discovery key or a group key or some other security key). If the verification is successful then the Discoverer WD knows that the Discoveree WD is within proximity.

Step 312. The Discoverer WD, according to Embodiments 4, forwards the Token to the ProSe Function in the network. The ProSe Function in the network verifies the Token using the shared secret key (for example a Discovery key or a group key or some other security key). If the verification is successful then the ProSe Function knows that the Discoveree WD is genuine and within proximity. The ProSe Function in the network informs the Discoverer WD. Discoverer WD knows now that the Discoveree WD is within proximity.

Particular reference is now made to the flowchart of FIG. 10.

Step 401. The Discoveree WD receives an announced code and/or identitie(s) in a Direct Discovery request message from a Discoverer UE.

Step 402. The Discoveree WD requests ProSe Function in the network to match the announced code and/or identitie(s), or the Discoveree WD matches the announced code and/or identitie(s) locally.

Step 403. If the match is successful, then the Discoveree WD requests ProSe Function in the network to generate a Token, or the Discoveree WD generates the Token locally itself. In the first case, the ProSe Function in the network provides the Token to the Discoveree WD.

Step 404. The Discoveree WD announces the Direct Discovery Response message including the Token.

Step 405. The Discoverer WD hears the announced Direct Discovery Response message including the Token.

Step 406. The Discoverer WD verifies the Token in the announced Direct Discovery Response message. The Discoverer WD could also request the ProSe Function in the network to verify the Token on behalf of the Discoverer WD. If the verification is successful then the Discoverer WD and Discoveree WD can start communication.

If the Token comprises a freshness value which the Discoverer WD in step 311 is not able to verify itself, then Discoverer WD may request the ProSe Function in the network to check the freshness value in step 312.

Further details of encryption of identities in Direct Discovery Response messages will now be disclosed.

According to embodiments (hereinafter denoted Embodiment 5), if there, for example in Model B, are two broadcasted identifiers in the Direct Discovery Response message, for example a ProSe Application Identifier and a ProSe WD Identifier of the Discoveree WD, then it may be possible to encrypt the ProSe WD Identifier of the Discoveree WD, since the Discoverer WD may be enabled to filter out the Direct Discovery Response messages it is interested in by monitoring the ProSe Application Identifier which it is interested in. The ProSe Application Identifier would then be sent in clear text. Table 3 summarizes examples of broadcasted identifiers included in a Direct Discovery Response message.

TABLE 3

Examples of two broadcasted identities included in a Direct Discovery Response message

| Discovery Model = Model B (Direct Discovery Response) | ProSe Application Identifier or ProSe App Code | Encrypted ProSe WD Identifier of Discoveree WD or Encrypted Group member identifier of Discoveree WD | Token (MAC) |
|---|---|---|---|

Partial encryption of the Direct Discovery Response message would imply that Discoverer WD interested in a ProSe Application Identifier would need to decrypt the ProSe WD Identifier of Discoveree WD or Group member identifier of Discoveree WD in order to find out who has responded to the Direct Discovery Request message which Discoverer WD originally broadcasted.

If the Direct Discovery Response message only comprises one identifier as a ProSe WD identifier of the Discoveree WD or a Group member identifier of the Discoveree WD, also this identifier may be encrypted. It may be possible for the Discoverer WD to decrypt all broadcasted Direct Discovery Response messages it listens to, as the Discoverer WD then may not be able to filter out the Direct Discovery Response messages the Discoverer WD is interested in.

If it is assumed that partial encryption cannot be provided, the identifiers may not be broadcast in clear text and instead some temporary identifier allocated by the ProSe Function in the network may be temporarily broadcast.

Further details of encryption of identities in Direct Discovery Request messages will now be disclosed.

According to embodiments (hereinafter denoted Embodiment 6), if there, for example in Model B, are two broadcasted identifiers in the Direct Discovery Request message, for example a ProSe Application Identifier and a ProSe WD Identifier of the Discoverer WD, then it may be possible to encrypt the ProSe WD Identifier of the Discoverer WD, since the Discoveree WD may be enabled to filter out the Direct Discovery Request messages it is interested in by monitoring the ProSe Application Identifier. The ProSe Application Identifier may then be transmitted in clear text. Table 4 summarizes examples of broadcasted identifiers included in a Direct Discovery Request message.

TABLE 4

Examples of two broadcasted identities included in a Direct Discovery Request message

| Discovery Model = Model B (Direct Discovery Request) | ProSe Application Identifier or ProSe App Code | Encrypted ProSe WD Identifier of Discoverer WD or Encrypted Group Identifier | Token or MAC |
|---|---|---|---|

Partial encryption of the Direct Discovery Request message would imply that Discoveree WDs interested in a ProSe Application Identifier would need to 1) decrypt the Group Identifier in order to find out whether the Direct Discovery Request message is addressed to them; or 2) decrypt the ProSe WD Identifier of Discoverer WD in order to find out what Discoverer WD transmitted the discovery request.

If the Direct Discovery Request message only comprises one identifier as a ProSe Application Identifier or a ProSe Application Code or Group Identifier, also this identifier may be encrypted. It may be possible for the Discoveree WD to decrypt all broadcasted Direct Discovery Request messages it listens to, as the Discoveree WD then may not be able to filter out the Direct Discovery Request messages the Discoveree WD is interested in.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although referring to Model B, the embodiments disclosed herein are also applicable, mutatis mutandis, to Model A.

The invention claimed is:

1. A method for authentication in device to device discovery, the method being performed by a network node, comprising:
    receiving a discovery request message transmitted by a discoverer device, the discovery request message requesting a permission to announce an application identifier;
    transmitting to the discoverer device a discovery response message comprising the application identifier;
    receiving, from a discoveree device, a token generation request to generate a first token, the token generation request comprising the application identifier;
    in response to receiving the token generation request transmitted by the discoveree device and comprising the application identifier, generating the first token using a security key and the application identifier;
    transmitting the first token to the discoveree device;
    receiving, from a discoverer device, a verification request to verify the first token;
    in response to receiving the verification request, verifying the first token, wherein verifying the first token comprises generating a second token using information included in the verification request and comparing the second token to the first token; and
    transmitting to the discoverer device a message indicating that the first token is authenticate.

2. The method according to claim 1, further comprising:
    receiving a request to generate a second token from the discoverer device;
    generating the second token.

3. The method according to claim 2, further comprising: transmitting the second token to the discoverer device.

4. A network node for authentication in device to device discovery, the network node comprising a processing unit and a non-transitory computer readable storage medium, said non-transitory computer readable storage medium comprising instructions executable by said processing unit whereby said network node is operative to:
    receive a discovery request message transmitted by a discoverer device, the discovery request message requesting a permission to announce an application identifier;
    transmit to the discoverer device a discovery response message comprising the application identifier;

receive, from a discoveree device, a token generation request to generate a first token, the token generation request comprising the application identifier;

in response to receiving the token generation request transmitted by the discoveree device and comprising the application identifier, generate the first token using a security key and the application identifier;

transmit the first token to the discoveree device;

receive, from the discoverer device, a verification request to verify the first token;

in response to receiving the verification request, verify the first token, wherein the network node is configured to verify the first token by performing a process comprising generating a second token using information included in the verification request and comparing the second token to the first token; and transmit to the discoverer device a message indicating that the first token is authenticate.

5. A computer program product comprising a non-transitory computer readable medium storing a computer program for authentication in device to device discovery, the computer program comprising computer code which, when run on a network node, causes the network node to:

transmit to a discoverer device a discovery response message responding to a discovery request message transmitted by the discoverer device, the discovery request message requesting a permission to announce an application identifier, and the discovery response message comprising the application identifier;

after receiving a token generation request transmitted by a discoveree device and comprising the application identifier, wherein the received token generation request comprises the application identifier, generate a first token using a security key and the application identifier;

transmit the first token to the discoveree device;

in response to receiving a verification request transmitted by the discoverer device, verify the first token, wherein the computer program is configured to verify the first token by performing a process comprising generating a second token using information included in the verification request and comparing the second token to the first token; and transmit to the discoverer device a message indicating that the first token is authenticate.

* * * * *

UNITED STATES PATENT AND TRADEMARK OFFICE
CERTIFICATE OF CORRECTION

PATENT NO.          : 10,064,053 B2
APPLICATION NO.     : 14/437662
DATED               : August 28, 2018
INVENTOR(S)         : Lehtovirta et al.

Page 1 of 2

It is certified that error appears in the above-identified patent and that said Letters Patent is hereby corrected as shown below:

On the Title Page

In Item (71), under "Applicant", in Column 1, Line 1, delete "TELEFONAKTIEBOLGET" and insert -- TELEFONAKTIEBOLAGET --, therefor.

In Figure, for Step "309", in Line 2, delete "Token;" and insert -- Token --, therefor.

In the Drawings

In Fig. 7, Sheet 4 of 10, for Step "207", in Line 1, delete "Reuest" and insert -- Request --, therefor.

In Fig. 8, Sheet 5 of 10, delete "identfier-3," and insert -- identifier-3, --, therefor.

Figure 9:
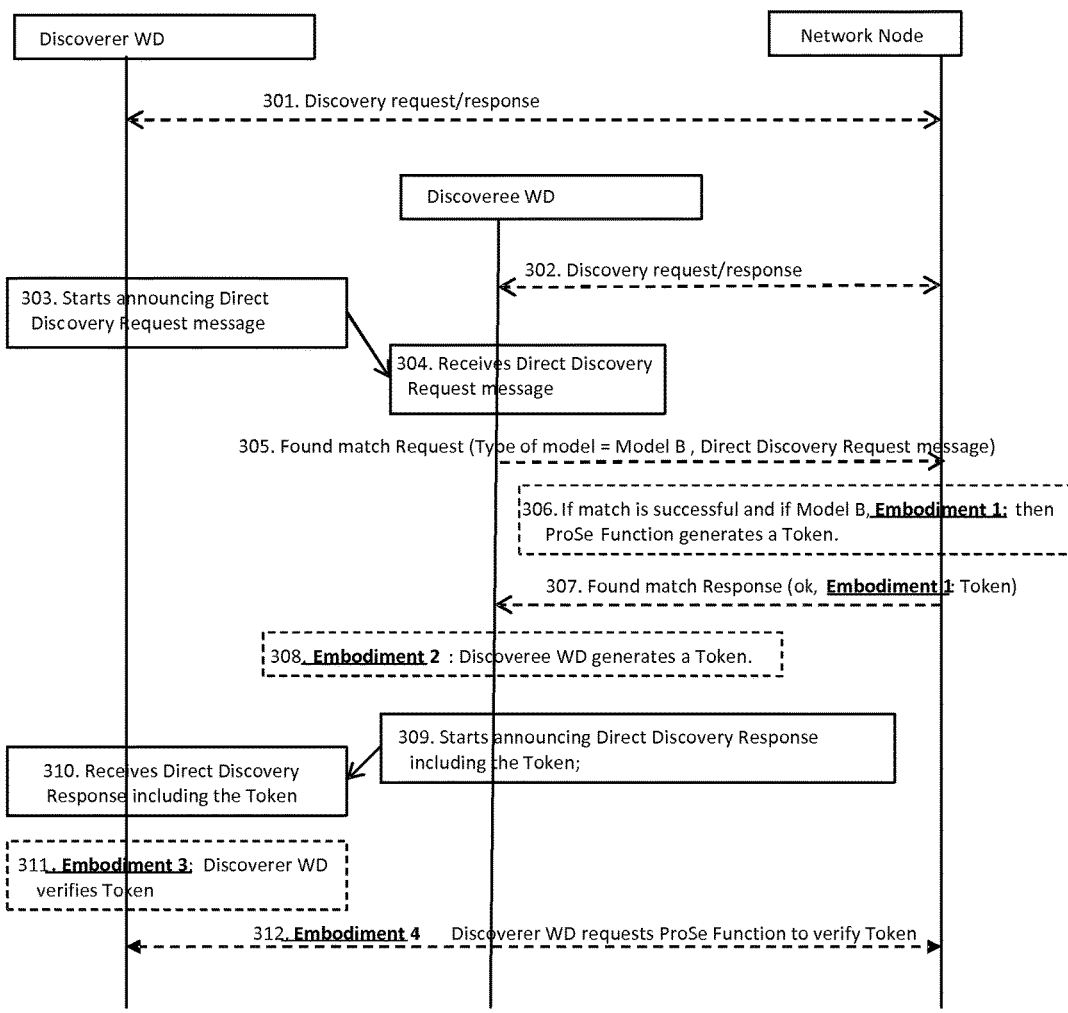

In Fig. 9, Sheet 5 of 10, for Step "309", in Line 2, delete "Token;" and insert -- Token --, therefor.

In Fig. 10, Sheet 6 of 10, for Step "402", in Line 2, delete "and/or i" and insert -- and/or --, therefor.

In Fig. 10, Sheet 6 of 10, for Step "402", in Line 3, delete "and/or i" and insert -- and/or --, therefor.

In the Specification

In Column 3, Line 45, delete "eight" and insert -- eighth --, therefor.

In Column 3, Line 65, delete "eight," and insert -- eighth, --, therefor.

In Column 4, Line 1, delete "eight," and insert -- eighth, --, therefor.

In Column 5, Line 54, delete "UE's" and insert -- UEs --, therefor.

In Column 8, Lines 17-18, delete "as shows" and insert -- as shown --, therefor.

Signed and Sealed this
Twentieth Day of August, 2019

Andrei Iancu
*Director of the United States Patent and Trademark Office*

CERTIFICATE OF CORRECTION (continued)
U.S. Pat. No. 10,064,053 B2

In Column 9, Line 51, delete "processing unit 42" and insert -- processing unit 41 --, therefor.

In Column 10, Line 5, delete "to from" and insert -- to form --, therefor.

In Column 10, Line 47, delete "module sic," and insert -- module 51c, --, therefor.

In Column 10, Line 52, delete "to from" and insert -- to form --, therefor.

In Column 10, Line 56, delete "are flow chart" and insert -- are flow charts --, therefor.

In Column 14, Line 14, delete "(Release 12)'—Section" and insert -- (Release 12)'—V1.1.0, Section --, therefor.

In Column 16, Line 53, delete "MAC's" and insert -- MACs --, therefor.

In Column 17, Line 21, delete "(not illustrate in the FIG.:" and insert -- (not illustrated in the FIG.): --, therefor.